(12) United States Patent
Baldwin et al.

(10) Patent No.: US 10,334,149 B2
(45) Date of Patent: Jun. 25, 2019

(54) ADJUSTMENT FOR CAMERAS FOR LOW POWER MODE OPERATION

(71) Applicant: QUALCOMM Incorporated, San Diego, CA (US)

(72) Inventors: Cullum Baldwin, San Diego, CA (US); Pasi Parkkila, San Diego, CA (US); Jeyaprakash Soundrapandian, San Diego, CA (US); Meghana Barkalle, San Diego, CA (US); Harsh Narendra Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 15/685,544

(22) Filed: Aug. 24, 2017

(65) Prior Publication Data

US 2018/0241922 A1    Aug. 23, 2018

Related U.S. Application Data

(60) Provisional application No. 62/482,617, filed on Apr. 6, 2017, provisional application No. 62/462,731, filed on Feb. 23, 2017.

(51) Int. Cl.
*H04N 5/067* (2006.01)
*H04N 5/225* (2006.01)
(Continued)

(52) U.S. Cl.
CPC ........... *H04N 5/2259* (2013.01); *H04N 5/067* (2013.01); *H04N 5/2258* (2013.01);
(Continued)

(58) Field of Classification Search
CPC .. H04N 5/2259; H04N 5/23241; H04N 5/067; H04N 5/23296; H04N 5/2258; H04N 5/23245; H04N 5/247
See application file for complete search history.

(56) References Cited

U.S. PATENT DOCUMENTS 7,683,962 B2    3/2010   Border et al.
9,049,663 B2    6/2015   Rabii
(Continued)

FOREIGN PATENT DOCUMENTS

EP    2874386 A1    5/2015
WO    2016130325 A1    8/2016

OTHER PUBLICATIONS

International Search Report and Written Opinion—PCT/US2018/014232—ISA/EPO—dated May 4, 2018 (16 pp).
(Continued)

*Primary Examiner* — Luong T Nguyen
(74) *Attorney, Agent, or Firm* — Shumaker & Sieffert, P.A.

(57) ABSTRACT

Example techniques are described for low power mode operation for multi-camera devices. A camera device includes processing circuitry configured to determine what information from the first camera is needed to process image content captured by the second camera or to operate the second camera, and adjust an operation mode of one of the first camera or camera circuitry coupled to the first camera from a first operation mode to a second operation mode based on the determination. An amount of power consumed by the first camera or the camera circuitry coupled to the first camera in the second operation mode is different than an amount of power consumed by the first camera or the camera circuitry in the first operation mode.

28 Claims, 7 Drawing Sheets

(51) Int. Cl.
*H04N 5/232* (2006.01)
*H04N 5/247* (2006.01)

(52) U.S. Cl.
CPC ..... *H04N 5/23241* (2013.01); *H04N 5/23245* (2013.01); *H04N 5/23296* (2013.01); *H04N 5/247* (2013.01)

(56) References Cited

U.S. PATENT DOCUMENTS

| | | | |
|---|---|---|---|
| 9,426,366 B2 | 8/2016 | Park et al. | |
| 9,477,319 B1 | 10/2016 | Baldwin et al. | |
| 2008/0024614 A1 | 1/2008 | Li et al. | |
| 2011/0310219 A1* | 12/2011 | Kim | G08B 13/19643 348/36 |
| 2012/0044373 A1* | 2/2012 | Shiozaki | G03B 35/08 348/218.1 |
| 2012/0062780 A1 | 3/2012 | Morihisa | |
| 2012/0293680 A1* | 11/2012 | Guan | H04N 5/232 348/222.1 |
| 2015/0036047 A1* | 2/2015 | Bledsoe | H04N 5/2254 348/375 |
| 2016/0212358 A1 | 7/2016 | Shikata | |
| 2016/0227160 A1* | 8/2016 | Baek | G06F 13/4265 |

OTHER PUBLICATIONS

Reply to Written Opinion from corresponding PCT/US2018/014232 filed on Jun. 25, 2018 (9 pp).
Second Written Opinion of International Application No. PCT/US2018/014232, dated Jan. 9, 2019, 5 pp.

* cited by examiner

ADJUSTMENT FOR CAMERAS FOR LOW POWER MODE OPERATION

This application claims the benefit of U.S. Provisional Application No. 62/462,731, filed Feb. 23, 2017, and U.S. Provisional Application No. 62/482,617, filed Apr. 6, 2017, the entire contents of each of which are hereby incorporated by reference.

TECHNICAL FIELD

The disclosure relates to power modes for camera devices.

BACKGROUND

Certain camera devices include a plurality of cameras. Each camera includes a camera sensor. In some camera devices, a first camera sensor of a first camera captures a relatively large field of view (e.g., wide angle), and a second camera sensor of a second camera captures a smaller field of view as compared to the first sensor but with better detail. A camera device may use image content captured by both the first and second camera sensors to generate an image, or use image content from one sensor sometimes, and use image content from the other sensor other times.

SUMMARY

In general, this disclosure describes techniques for selectively controlling a camera module that includes a plurality of cameras to operate in a low power mode for processing of image content. For instance, a first camera may be a master camera, and a second camera may be a slave camera that relies on information from the first camera to operate. In the techniques described in this disclosure, in low power mode, the processing of the image content captured by first camera may be reduced or dropped, but there is still sufficient processing to allow the first camera to provide the information for the second sensor, if needed. Alternatively, in the low power mode, the camera device may disable a mode for the second camera so that the second camera does not need the synchronization information.

In some examples, factors such as whether aiding statistics (e.g., information used for aiding in processing) from image content captured by the first camera may be needed by circuitry coupled to the second camera to operate, but the actual image content captured by the first camera may not be needed. In low power mode, the first camera may provide sufficient processing to provide information such as aiding statistics (e.g., synchronization signals described in more detail) without needing to process all of the image content.

In one example, this disclosure describes a device for image processing, the device comprising processing circuitry configured to determine what information from a first camera is needed to process image content captured by a second camera or to operate the second camera, and adjust an operation mode of at least one of the first camera or camera circuitry coupled to the first camera from a first operation mode to a second operation mode, different than the first operation mode, based on the determination, wherein an amount of power consumed by the first camera or the camera circuitry coupled to the first camera in the second operation mode is different than an amount of power consumed by the first camera or the camera circuitry coupled to the first camera in the first operation mode.

In one example, the disclosure describes a method of image processing, the method comprising determining, with processing circuitry, what information from a first camera is needed to process image content captured by a second camera or to operate the second camera, and adjusting, with the processing circuitry, an operation mode of one of the first camera or camera circuitry coupled to the first camera from a first operation mode to a second operation mode, different than the first operation mode, based on the determination, wherein an amount of power consumed by the first camera or the camera circuitry coupled to the first camera in the second operation mode is different than an amount of power consumed by the first camera or the camera circuitry coupled to the first camera in the first operation mode.

In one example, the disclosure describes a computer-readable storage medium storing instructions thereon that when executed cause one or more processors of a device for image processing to determine what information from a first camera is needed to process image content captured by a second camera or to operate the second camera, and adjust an operation mode of one of the first camera or camera circuitry coupled to the first camera from a first operation mode to a second operation mode, different than the first operation mode, based on the determination, wherein an amount of power consumed by the first camera or the camera circuitry coupled to the first camera in the second operation mode is different than an amount of power consumed by the first camera or the camera circuitry coupled to the first camera in the first operation mode.

In one example, the disclosure describes a device for image processing, the device comprising means for determining what information from a first camera is needed to process image content captured by a second camera or to operate the second camera, and means for adjusting an operation mode of one of the first camera or camera circuitry coupled to the first camera from a first operation mode to a second operation mode, different than the first operation mode, based on the determination, wherein an amount of power consumed by the first camera or the camera circuitry coupled to the first camera in the second operation mode is different than an amount of power consumed by the first camera or the camera circuitry coupled to the first camera in the first operation mode.

The details of one or more examples are set forth in the accompanying drawings and the description below. Other features, objects, and advantages will be apparent from the description, drawings, and claims.

DETAILED DESCRIPTION

Figure 1:
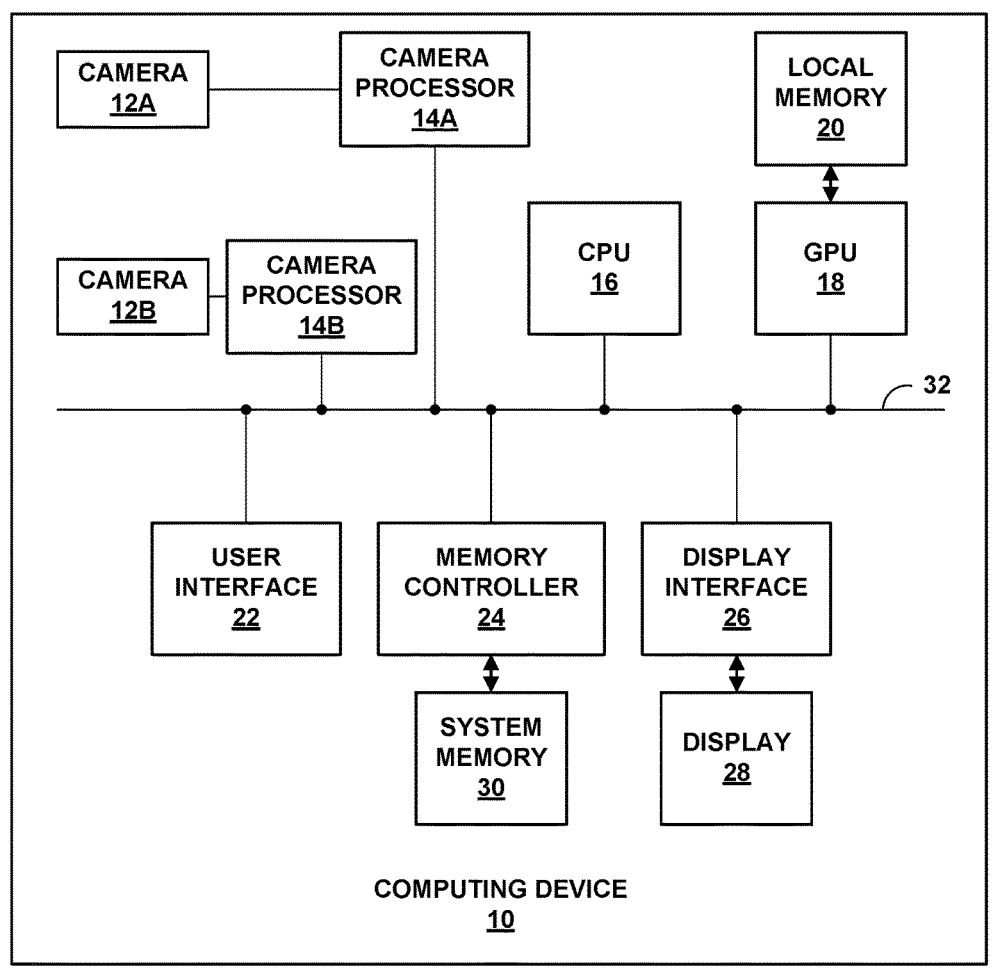
FIG. 1 is a block diagram of a device configured to perform one or more of the example techniques described in this disclosure.

The example techniques described in this disclosure are related to selective operation in a low power mode in camera devices that include two or more camera sensors. A first camera sensor (or simply first sensor) and second camera sensor (or simply second sensor) may each be configured to capture different image content. For instance, the first sensor may be configured to capture a relatively large field of view, and a second camera sensor may be configured to capture a smaller field of view but with more detail (e.g., image resolution), or vice-versa.

Having such a dual camera sensor device may be beneficial for various applications. For instance, with only one sensor that captures a large field of view, referred to as a wide-angle sensor, there may be a relatively large area of image content that is captured, but when zooming into the image content, the image resolution may suffer. With only one sensor with a smaller field of view but more detail, the field of view may be too small, resulting in images that do not capture as much content as desired.

In some examples of devices with dual camera sensors, the device uses the image content from both of the sensors to generate higher quality images as compared to images produced by only one sensor. The above is one example way in which a first and a second sensor may be used to generate images. However, the techniques described in this disclosure are not so limited. The sensors of the device need not necessarily be limited to the above examples, and other types of sensors may be used instead, or the same or other types of sensors may be used for different purposes (e.g., for a reason other than zoom, such as depth detection).

However, using two sensors tends to drain power relatively fast, and mobile devices may be sensitive to such power drain. Also, because the power usage may not scale linearly, using two sensors may use more than twice the power as compared to using a single sensor.

This disclosure describes example techniques for low power mode in examples where a device includes two or more camera sensors. In certain scenarios, there may not be a need to process images from both sensors. For example, in a preview mode (e.g., the mode where a viewer is viewing the content that could be converted into an image prior to taking the image), image content captured from only one sensor may be sufficient. There may be other scenarios where image content from only one sensor is needed as well.

Each of the sensors may be coupled to respective camera circuitry for processing the captured image content. In one example of a low power mode, a central processing unit (CPU) may determine that image content is not needed from one of the sensors (e.g., based on a timer indicating that image content from one of the sensors is not being used), and may place the camera circuitry corresponding to the sensor whose image content is not needed, and that sensor itself, in sleep mode. In the sleep mode, which is an example of the low power mode, the sensor does not generate image content, the camera circuitry does not process image content, and the power consumed by the camera circuitry and the sensor is minimal. Both the sensor and the camera circuitry may be performing very little operations in sleep mode.

However, such a sleep mode as one example of a low power mode may not be available in all instances. In the multi-camera sensor device (e.g., a dual camera sensor device), one of the sensors is a master sensor and the other sensor(s) may be a slave sensor(s). The master sensor provides timing information, such as a synchronization signal, to the slave sensor(s) to synchronize each sensor capturing image content at substantially the same time, and to ensure a common number of frames are captured per second (e.g., frames-per-second (fps)). If the master sensor and its camera circuitry are placed in sleep mode, the master sensor may not be able to generate the synchronization signal, which may potentially result in poor image quality.

Which sensor is the master sensor and which sensor(s) are the slave sensor(s) may be preset, and may not change dynamically in some examples. For instance, the first sensor may be set to be the master, and the second sensor may be set to be the slave, and this relationship may not change in some examples. However, there could be times when image content from the first sensor is not needed, but placing the first sensor in the sleep mode results in loss of the synchronization signal.

There may be instances when the master-slave relationship changes during operation. For example, a previous slave sensor may become a master sensor, and vice-versa. The techniques described in this disclosure are applicable to examples where the master-slave relationship can change.

This disclosure describes example techniques for a low power mode when some or all image content from the master sensor is not needed. For example, each of the sensors is coupled to respective camera circuitry. In one example of low power mode, each of the sensors may capture frames of image content; however, the camera circuitry of the sensor whose image content is not needed may drop the frames captured by that sensor from further processing. In this way, the sensor may still be fully operational including capturing image content and providing the synchronization signal, but the camera circuitry can be placed in sleep mode, thereby conserving power. This low power mode is referred to as frame drop mode.

In some examples, some of the image content captured by the sensor may be needed. For instance, the exposure metric (e.g., how much light is exposed) may be information that the camera circuitry, whose sensor can be placed in low power mode, still needs to determine. However, not all image frames may be needed. In one example of the low power mode, the camera processing circuitry for the sensor whose image content is not all needed may skip frames captured by the sensor (e.g., skip processing of every other frame, every third frame, and so forth). In this way, the sensor may still be fully operational, including capturing image content and providing the synchronization signal, but the camera circuitry can be processing fewer frames, thereby conserving power. This low power mode is referred to as frame skip mode.

In some cases, it may be possible for the slave sensor to operate without synchronization signal from the master sensor. One example of a low power mode is to instruct the master sensor to turn off the synchronization signal. This allows the master sensor and the slave sensor to generate image frames at different frame rates.

Because there is no synchronization, it may be possible to reduce the frame rate of images captured by the sensor whose image content is not all needed, or not needed at all, to reduce the amount of processing performed by its corresponding camera circuitry to conserve power. This low power mode is referred to as sync-disable mode. For instance, in the frame skip mode, the camera circuitry may still perform operations at a multiple of the frame rate at which the sensor generated image frames (e.g., if sensor generated image frames at 30 fps, and the camera circuitry dropped every other frame, the camera circuitry is operating at 15 fps). In sync-disable mode, the frame rate of the camera circuitry may be configured to capture frames at rates other than a multiple of the frame rate (e.g., camera circuitry is operating at 17 fps).

The above are a few examples of low power mode. In some examples, a device may be configured to perform only one of the different low power modes, and in some examples, a device may be configured to perform a plurality of the different low power modes. For instance, a device may first determine if the sleep mode is available, and if available, perform the operations for the sleep mode. If not available, the device may determine if frame drop mode is available, and if available, perform the operations of the frame drop mode. If not available, the device may determine if frame skip mode is available, and if available, perform the operations of the frame skip mode. If not available, the device may determine if sync-disable mode is available, and if available, perform the operations of the sync-disable mode. In some examples, a device may determine which of the low power modes are available, rather than testing through each one in a particular order, and select one of the available low power modes.

In some examples, the example techniques may control the position of a lens or lenses within sensors for power control. For instance, the location of the lens in a sensor module affects the amount of current the sensor module draws. In situations where a particular sensor is not needed, camera circuitry may adjust the position of the lens to a position where the sensor module draws minimal power. Then, when the sensor is needed, camera circuitry may adjust the position of the lens to the needed location for capturing image content.

FIG. 1 is a block diagram of a device configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA). Additional examples of computing device 10 include a personal music player, a video player, a display device, a camera, a television, a set-top box, a broadcast receiver device, a server, an intermediate network device, a mainframe computer or any other type of device that processes and/or displays graphical data.

As illustrated in the example of FIG. 1, computing device 10 includes first camera 12A (or simply "camera 12A") and second camera 12B (or simply "camera 12B"), camera processors 14A and 14B, a central processing unit (CPU) 16, a graphical processing unit (GPU) 18 and local memory 20 of GPU 18, user interface 22, memory controller 24 that provides access to system memory 30, and display interface 26 that outputs signals that cause graphical data to be displayed on display 28. In this disclosure, the term "sensor" and "camera" are used interchangeably.

While the example techniques are described with respect to two cameras 12A, 12B, the example techniques are not so limited, and may be applicable to the various camera types used for capturing images/videos. In some examples, computing device 10 may include a plurality of cameras (e.g., more than cameras 12A and 12B). Cameras 12A and 12B may be housed in a camera module illustrated in FIG. 2.

Also, although the various components are illustrated as separate components, in some examples the components may be combined to form a system on chip (SoC). As an example, camera processors 14A, 14B, CPU 16, GPU 18, and display interface 26 may be formed on a common integrated circuit (IC) chip. In some examples, one or more of camera processors 14A, 14B, CPU 16, GPU 18, and display interface 26 may be in separate IC chips. Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. The specific configuration of buses and communication interfaces between the different components shown in FIG. 1 is merely exemplary, and other configurations of computing devices and/or other image processing systems with the same or different components may be used to implement the techniques of this disclosure.

Camera processor 14A is configured to receive image frames from camera 12A, and process the image frames to generate image content. Similarly, camera processor 14B is configured to receive frames from camera 12B, and process the image frames to generate image content. CPU 16, GPU 18, one or both of camera processors 14A and 14B, or some other circuitry may be configured to process the image content generated by camera processors 14A and 14B into images for display on display 28.

In some examples, camera processors 14A and 14B may be configured as an image processing pipeline. For instance, camera processors 14A and 14B may each include a camera interface that interfaces between respective cameras 12A and 12B and camera processors 14A and 14B. Camera processors 14A and 14B may include additional circuitry to process the image content.

Camera processors 14A and 14B output the resulting images (e.g., pixel values for each of the image pixels) to system memory 30 via memory controller 24. Each of the images may be further processed for generating a final image for display. For example, GPU 18 or some other processing unit including camera processors 14A and 14B itself may perform the blending between the image content generated by camera processors 14A and 14B to generate the final image content for display.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a word processor application, a web browser application, an email application, a graphics editing application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 22.

One example of the software application is a camera application. CPU 16 executes the camera application, and in response, the camera application causes CPU 16 to generate content that display 28 outputs. For instance, display 28 may output information such as light intensity, whether flash is enabled, and other such information. The user of computing device 10 may interface with display 28 to configure the manner in which the images are generated (e.g., with or without flash, focus settings, exposure settings, and other parameters). The camera application also causes CPU 16 to instruct camera processors 14A and 14B to process the images captured by camera 12A and 12B in the user-defined manner.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processors 14A and 14B, CPU 16, and GPU 18. For example, system memory 30 may store user applications (e.g., instructions for the camera application), resulting images from camera processors 14A and 14B, etc. System memory 30 may additionally store information for use by and/or generated by other components of computing device 10. For example, system memory 30 may act as a device memory for camera processors 14A and 14B. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 30 may include instructions that cause camera processors 14A and 14B, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processors 14A and 14B, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processors 14A and 14B, CPU 16, and GPU 18 may store image data, and the like in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

In examples described in this disclosure, there may be times when some information from one of cameras 12A or 12B may not be needed to process image content captured by the other one of cameras 12A or 12B or to operate the other one of cameras 12A or 12B. For instance, some or all of the image content captured by one of cameras 12A or 12B is not needed for the operation of the other one of cameras 12A or 12B. As another example, image content information from images captured by one of cameras 12A or 12B is not needed for the operation of the other one of cameras 12A or 12B.

In such examples, power savings may be possible by reducing the power consumed by the one of cameras 12A or 12B and the corresponding one of camera processors 14A or 14B (e.g., by causing the respective camera and camera processor to enter low power mode). For example, if there is no user intervention or change in operation for a certain amount of time, CPU 16 may determine that not all image content or no image content from one of cameras 12A or 12B is needed. For ease of description, the examples are described with respect to image content from camera 12B not being needed, but the example techniques would be similar if image content from camera 12A is not needed.

In one example, if image content from camera 12B is not needed, CPU 16 may cause camera 12B and camera processor 14B to go into a sleep mode, in which camera 12B does not generate any image frames, and camera processor 14B does not process any image frames. This example of low power mode is referred to as sleep mode.

As another example, if image content from camera 12B is not needed, CPU 16 may still cause camera 12B to generate image frames, but cause camera processor 14B to drop the generated image frames (e.g., perform no operations on the image frames). This example of low power mode is referred to as frame drop mode.

As another example, if some, but not all, image content from camera 12B is needed, CPU 16 may still cause camera 12B to generate image frames, but cause camera processor 14B to skip processing of one or more generated image frames (e.g., skip processing every second, third, fourth, and so on frame). This example of low power mode is referred to as frame skip mode.

In this disclosure, operation where image content captured by camera 12B is being fully processed by camera processor 14B may be considered as camera 12B and camera processor 14B operating in a first operation mode. The operation where camera 12B does not capture image content, where camera processor 14B drops processing of frames, or where camera processor 14B skips processing of some but not all frames may be considered as camera 12B and/or camera processor 14B operating in a second operation mode. In examples described in this disclosure, camera 12B and/or camera processor 14B may consume less power in the second operation mode as compared to the first operation mode.

For instance, CPU 16 may determine what information from camera 12B is needed to process image content captured by camera 12A or to operate camera 12A. CPU 16 may adjust an operation mode of camera 12B and/or camera processor 14B from the first operation mode (e.g., where camera 12B and camera processor 14B are operating to capture image content and process all frames) to the second operation mode. An amount of power consumed by the camera 12B and/or camera processor 14B in the second operation mode is different than an amount of power consumed by camera 12B and/or camera processor 14B in the first operation mode. In some examples, an amount of power consumed by the camera 12B and/or camera processor 14B in the second operation mode is less than an amount of power consumed by camera 12B and/or camera processor 14B in the first operation mode. The examples of the second operation mode are low power modes such as the sleep mode, frame drop mode, or the frame sleep mode. There are additional examples of the second operation mode where power consumption is reduced such as examples where the lens of camera 12B is moved to reduce power consumption.

While sleep mode has the potential of providing the greatest reduction in power usage, there may be certain issues. In operation, one of camera 12A or camera 12B may be a master camera, and the other a slave camera, and this relationship may not change. One of the functions of the master camera is to output a synchronization signal to the slave camera to indicate to the slave camera when to capture image content and information about the frame rate at which the slave camera should generate image frames so that the master camera and the slave camera capture at the same time, and generate image frames at the same frame rate.

There are various example ways in which the synchronization signal is generated and output. As one example, the synchronization signal may be a rising edge of a pulse that triggers the slave camera to capture image content. As another example, the synchronization signal may be a falling edge of a pulse. Other example ways in which the synchronization signal is generated are possible.

In the example of the sleep mode, if camera 12B is the master sensor, and camera 12B were placed in sleep mode, then camera 12B may not generate the synchronization signals. Therefore, camera 12A (slave camera in this example) may not receive the synchronization signals, and the overall system may not operate as properly. However, if camera 12A were the master sensor, and camera 12B were placed in the sleep mode, then camera 12A may operate without issue, and camera 12B can be awoken when needed for operation and receive the synchronization signal from camera 12A.

In the frame drop mode, if camera 12B is the master, then there may be no change in the operation of camera 12B. For instance, camera 12B may generate image frames and synchronization signals without issue. From the perspective of camera 12B, there may be little to no change in its operation in frame drop mode as compared to normal mode. However, CPU 16 may cause camera processor 14B to perform no operations on the image frames generated by camera 12B. In some examples, the power consumption of camera processor 14B may be data-gated, meaning that if there is no data, then various logic circuits of camera processor 14B do not turn on. In this way, the frame drop mode may reduce overall power consumption.

In the above example, although frame drop mode is described with respect to camera 12B being the master camera, in some examples, frame drop mode may be possible even where camera 12B is not the master camera. For example, assume that camera 12B is the slave camera. Even in such an example, although camera 12B does not need to generate the synchronization signal, CPU 16 may still cause camera 12B to generate the image frames, but cause camera processor 14B to perform no processing on the image frame to conserve power.

In this example, to determine what information from a first camera (e.g., camera 12B) is needed to process image content captured by a second camera (e.g., camera 12A), CPU 16 may determine that in the first operation mode and the second operation mode, the second camera (e.g., camera 12A) uses synchronization signals from the first camera (e.g., camera 12B) for capturing image content. In this example, to adjust the operation mode, CPU 16 may cause camera circuitry coupled to the first camera (e.g., camera processor 14B is coupled to camera 12B) to drop from processing all image frames generated by the first camera (e.g., camera 12B).

In the frame skip mode, if camera 12B is the master, then there may be no change in the operation of camera 12B. For instance, camera 12B may generate image frames and synchronization signals without issue. From the perspective of camera 12B, there may be little to no change in its operation in frame skip mode as compared to normal mode. However, CPU 16 may cause camera processor 14B to perform operations on fewer image frames than all of the image frames generated by camera 12B. For instance, CPU 16 may cause camera processor 14B to skip processing of frames. In some examples, the power consumption of camera processor 14B may be data-gated, meaning that if there is no data, then various logic circuits of camera processor 14B do not turn on. Because camera processor 14B is processing fewer image frames, the frame skip mode may reduce overall power consumption.

In the above example, although frame skip mode is described with respect to camera 12B being the master sensor, in some examples, frame skip mode may be possible even where camera 12B is not the master sensor. For example, assume that camera 12B is the slave sensor. Even in such an example, although camera 12B does not need to generate the synchronization signal, CPU 16 may still cause camera 12B to generate the image frames, but cause camera processor 14B to perform no processing on the image frame to conserve power.

In this example, to determine what information from a first camera (e.g., camera 12B) is needed to process image content captured by a second camera (e.g., camera 12A), CPU 16 may determine that in the first operation mode and the second operation mode, the second camera (e.g., camera 12A) uses synchronization signals from the first camera (e.g., camera 12B) for capturing image content. In this example, to adjust the operation mode, CPU 16 may cause camera circuitry coupled to the first camera (e.g., camera processor 14B is coupled to camera 12B) to process some image frames generated by the first camera (e.g., camera 12B) and skip processing of some image frames generated by the first camera (e.g., camera 12B).

In the first operation mode, the second camera (e.g., camera 12A) uses synchronization signals from the first camera (e.g., camera 12B) for determining when to capture image content, and camera circuitry coupled to the second camera (e.g., camera processor 14A coupled to camera 12A) uses image content from the first camera for processing image content captured by the second camera. For instance, in the first operation mode, camera processor 14A may use the image content captured by camera 12B for zoom, when dual-image capture is needed, for exposure aiding, and for autofocus aiding as a few examples. In the second operation mode, the second camera (e.g., camera 12A) uses synchronization signals from the first camera (e.g., camera 12B) for determining when to capture image content.

However, in some examples, in the second operation mode, the camera circuitry coupled to the second camera (e.g., camera processor 14A coupled to camera 12A) does not use image content from the first camera (e.g., camera 12B) for processing image content captured by the second camera (e.g., camera 12A). In such examples, the processing circuitry (e.g., CPU 16) is configured to cause the camera circuitry coupled to the first camera (e.g., camera processor 14B coupled to camera 12B) to drop from processing all image frames generated by the first camera (e.g., camera 12B) in the second operation mode.

In some examples, in the second operation mode, the camera circuitry coupled to the second camera (e.g., camera processor 14A coupled to camera 12A) uses some but not all of the image content from the first camera (e.g., camera 12B) for processing image content captured by the second camera (e.g., camera 12A). In such examples, the processing circuitry (e.g., CPU 16) is configured to cause the camera circuitry coupled to the first camera (e.g., camera processor 14B coupled to camera 12B) to process some image frames generated from the first camera (e.g., camera 12B) and skip processing of some image frames generated from the first camera (e.g., camera 12B) in the second operation mode.

Another example of the low power mode (e.g., second operation mode) is a sync-disable mode. In the sync-disable mode, CPU 16 determines that synchronization is not needed between camera 12A, 12B and instructs camera 12A, 12B that synchronization is not needed. In such a case, the so-called master camera does not control when the slave camera captures image content and does not control the frame rate of the frames generated by the slave camera.

Because no synchronization is needed, CPU 16 may select the frame rate at which camera processors 14A, 14B operate. For example, if all the image content from camera 12B is not needed, then CPU 16 may instruct camera 12B to set the frame rate at zero or some very low frame rate to conserve power since there will be fewer frames to process. With the frame skip mode, the frame rate of the image frames from camera 12A, 12B may be a multiple of each other (e.g., frame rate of images from camera 12A is twice, thrice, four times, and so forth of the frame rate of images from camera 12B). In the sync-disable mode, the frame rates need not be such multiples.

In this example, camera processor 14B may be configured to generate image frames from the first camera (e.g., camera 12B) at a first rate in the first operation mode (e.g., normal mode). CPU 16 may determine that the second camera (e.g., camera 12A) does not need to use synchronization signals from the first camera. CPU 16 may cause camera processor 14B to generate image frames at a second rate in the second operation mode, where the second rate is lower than the first rate. Camera processor 14A may operate at generating image frames at a third rate that is greater than the second rate. As an example, camera processor 14A may operate at generating image frames from image content captured by camera 12A at 60 frames-per-second (fps), while camera processor 14B may operate at generating image frames from image content captured by camera 12B at 15 frames-per-second (fps).

In one or more examples described in this disclosure, a difference between the first operation mode and the second operation mode includes at least one of the following. Synchronization signals from the first camera (e.g., camera 12B) are needed, and no image frames generated by the first camera (e.g., camera 12B) are needed. Synchronization signals from the first camera (e.g., camera 12B) are needed, and some, and not all, image frames generated by the first camera (e.g., camera 12B) are needed. Image frames are generated by the first camera (e.g., camera 12B) and the second camera (e.g., camera 12A) at different frame rates.

In the above examples, whether synchronization was needed between cameras formed the basis for whether one of camera 12A or 12B and/or camera processor 14A or 14B could be placed in low power mode. However, the example techniques are not so limited. For example, rather than the full image content, information from the image content from captured image content by one of camera 12A or 12B may be useable by the other one of camera 12A or 12B and/or camera processor 14A or 14B.

In examples where, based on the camera application, the user is applying zoom or dual-image capture is in progress, then CPU 16 may determine that both camera 12A and 12B and camera processor 14A and 14B should be operating in normal mode (e.g., generating image content at full frame rate with synchronization between camera 12A and 12B).

As another example, assume that camera 12A is a tele-camera (e.g., configured to capture image content at a distance), and camera 12B is a wide-camera (e.g., configured to capture a wide amount of image content). In this example, CPU 16 may determine that camera 12A is to capture image content based on the manner in which the user is interacting with the camera application. However, if CPU 16 determines that the image content is dark such as based on the pixels generated by camera processor 14A, CPU 16 may ensure that camera 12B and camera processor 14B are operating in normal mode for exposure aiding. As another example, if camera 12A (e.g., tele-camera) lacks dual photodiode (2PD), CPU 16 may determine that high-speed autofocus (AF) is needed, and may ensure that camera 12B and camera processor 14B are in normal mode to use wide-2PD for autofocus aiding.

However, if CPU 16 determines that such aiding is not needed, then CPU 16 may adjust camera 12B and/or camera processor 14B from a first operation mode (e.g., normal mode) to a second operation mode (e.g., low power mode). For example, CPU 16 may cause camera 12B to not capture any image content, and cause camera processor 14B to stop generating image frames. As another example, such as frame drop or frame skip modes, CPU 16 may cause camera processor 14B to drop the processing of all frame output by camera 12B (e.g., frame drop mode) or skip the processing of some of the frames output by camera 12B (e.g., frame skip mode). In some examples, if CPU 16 determines that the temperature is too high, for thermal mitigation purposes, CPU 16 may adjust the operation mode of camera 12B and/or camera processor 14B into sleep mode, frame skip mode, or frame drop mode to reduce heat and/or power.

In frame drop mode, CPU 16 may determine that no exposure or focus aiding is needed, but synchronization signals may be needed. Accordingly, camera 12B may still generate the synchronization signals, but camera processor 14B may drop processing of the frames. In frame skip mode, CPU 16 may determine that some exposure or focus aiding is needed, and that synchronization signals may be needed. Accordingly, camera 12B may still generate the synchronization signals, but camera processor 14B may skip processing of some, but not all, frames.

As an example, CPU 16 may determine that some exposure/focus aiding is needed, but the aiding can be done at a lower frame rate. In this example, CPU 16 may cause camera processor 14B to generate one synchronized frame every four frames that camera processor 14A generates (e.g., the frame rate of camera processor 14B is one-fourth the frame rate of camera processor 14A).

As another example, camera 12B may be needed to generate a stereoscopic depth estimate at 10 Hz. For this case, camera processor 14B may need to be temporally matched with the frames generated by camera processor 14A (e.g., camera processor 14B generates a frame that is synchronized with a frame generated by camera processor 14A). However, camera processor 14B may not need to generate frames as frequently as camera processor 14A. In this example, camera processor 14B may generate one synchronized frame every three frames that camera processor 14A generates.

For the sync-disable mode, CPU 16 may determine that operation of both camera 12A and 12B is needed, but synchronization is not needed. In such an example, at start-up (e.g., when user first executes camera application or when user first turns on device 10), CPU 16 may determine to operate camera 12B and camera processor 14B at a high frame rate (e.g., camera processor 14B generates frames at a relatively high rate) to assist with fast automatic exposure control (AEC) estimate. In this example, camera processor 14B and camera processor 14A may generate frames at different rates.

As another example, CPU 16 may determine that camera 12B provides better automatic white balance (AWB) estimates due to intrinsic camera characteristics. However, the AWB estimates may only be needed occasionally. Accordingly, in this example, camera processor 14B may generate frames a different, lower rate than camera processor 14A (e.g., camera processor 14B generates frames at 5 Hz to save power).

There may be other ways in which to reduce power consumption in addition to or instead of the above example techniques. For instance, as described in more detail with respect to FIGS. 4, 5A, and 5B, CPU 16 may control the position of a lens of camera 12A or 12B to control the power consumption.

Figure 2:
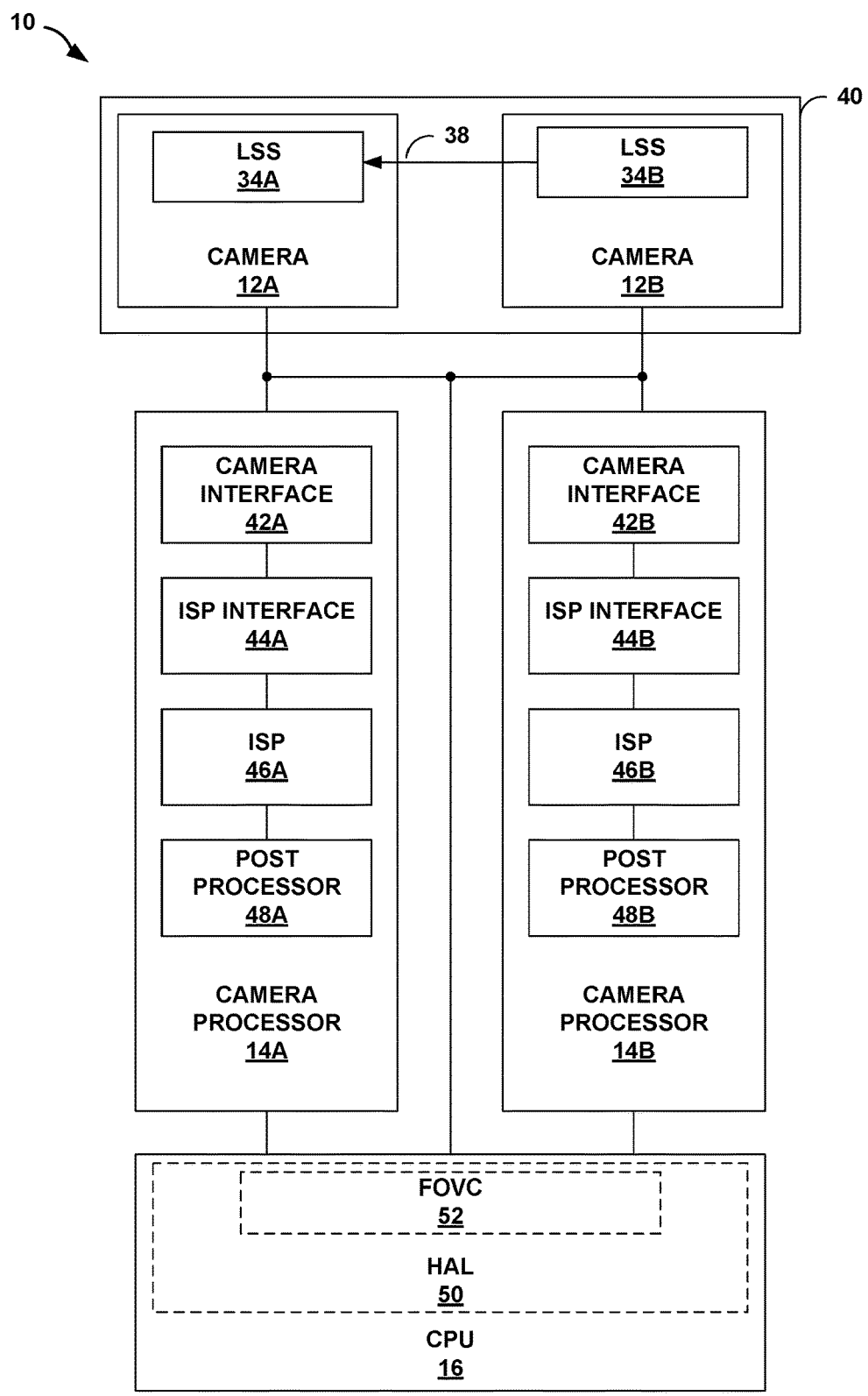
FIG. 2 is a block diagram illustrating sensors, camera processors, and a central processing unit (CPU) of the device of FIG. 1 in further detail.

FIG. 2 is a block diagram illustrating cameras, camera processors, and central processing unit (CPU) of the device of FIG. 1 in further detail. FIG. 2 may be considered as illustrating a system-of-systems. For example, FIG. 2 illustrates device 10, which may be considered as a system. Device 10 includes sub-systems such as camera module 40, camera processor 14A and 14B, and CPU 16. Camera module 40 includes sub-systems of camera 12A and 12B, which each include sub-systems of hardware components. Camera processor 14A and 14B include sub-subsystems of hardware and/or software components. Similarly, CPU 16 includes sub-subsystems of hardware and/or software components. In the example techniques described in this disclosure, CPU 16 may be configured to adjust the operation mode of any one or more of the sub-systems in the system-of-systems configuration from a first operation mode to a second operation mode for potential power savings.

As illustrated, camera 12A and 12B may be in a common housing of camera module 40. Camera module 40 may be formed with an aluminum housing, as one example, but other materials are possible. Camera 12A includes a lens sub-system (LSS) 34A. LSS 34A may be include a CMOS array (as one non-limiting example) for capturing light, and a sensor chip for generating an image frame. LSS 34A may also include a lens and other actuator circuitry to move the position of the lens. Similarly, camera 12B includes LSS 34B. LSS 34B may include a CMOS array (as one non-limiting example) for capturing light, and a sensor chip for generating an image frame. The sensor chip of camera 12B may generate the synchronization signal that the sensor chip of camera 12A receives to indicate when the sensor chip of camera 12A is to cause the CMOS array of camera 12A to capture image content, and when the sensor chip of camera 12A is to generate the image frames.

Each one of cameras 12A and 12B outputs to respective ones of camera interfaces 42A and 42B. Camera interfaces 42A and 42B may be configured to interface camera processors 14A and 14B to respective ones of cameras 12A and 12B. Image signal processor (ISP) interface 44A and ISP interface 44B receive image frames from respective ones of camera interface 42A and camera interface 42B, and output the image frames to respective ones of ISP 46A and ISP 46B. ISP 46A and ISP 46B perform image processing, and output to respective ones of post processors 48A and 48B for post-processing.

As illustrated, CPU 16 may execute hardware abstraction layer (HAL) 50, which may be software executing on CPU 16 that specializes CPU 16 to perform the example operations. For instance, CPU 16 may be configured to interface with camera processors 14A and 14 and cameras 12A and 12B with HAL 50. One of the routines of HAL 50 may be field of view control (FOVC) 52. FOVC 52 may cause CPU 16 to determine what information from camera 12B is needed to process image content captured by camera 12A or to operate camera 12A. For example, FOVC 52 may cause CPU 16 to determine whether all image content from one of cameras 12A or 12B is not needed (e.g., based on an internal timer and a determination that no image content from one of camera 12A or 12B was used, and therefore may not be needed). FOVC 52 may also control the combining of image content from cameras 12A and 12B and other such operations. HAL 50 and FOVC 52 are described as software operations, but the examples are not so limited, and the algorithms of HAL 50 and FOVC 52 may be performed by fixed-function circuits.

In the following, assume that all image content from camera 12B is not needed. For example, assume that all image content from camera 12B is not needed for aiding in exposure or focus. In the sleep mode, CPU 16, via HAL 50, may output a signal to camera 12B and camera processor 14B that places camera 12B and camera processor 14B in sleep mode. In the frame drop mode, CPU 16, via HAL 50, may output a signal to camera processor 14B that causes one of camera interface 42B, ISP interface 44B, ISP 46B, or post processor 48B to drop operation of received frames. Because camera interface 42B is the first circuit in camera processor 14B, CPU 16, via HAL 50, may cause camera interface 42B to drop the frames received from camera 12B. In the frame skip mode, CPU 16, via HAL 50, may output a signal to camera processor 14B that causes one of camera interface 42B, ISP interface 44B, ISP 46B, or post processor 48B to skip operation of one or more received frames. Because camera interface 42B is the first circuit in camera processor 14B, CPU 16, via HAL 50, may cause camera interface 42B to skip operation on one or more frames received from camera 12B, such that all further circuits of camera processor 14B may not perform any operations on the skipped frames.

For the sync-disable mode, CPU 16, via HAL 50, may output a signal to cameras 12A and 12B indicating that synchronization is disabled. CPU 16, via HAL 50, may set the respective frame rates from cameras 12A and 12B to reduce the amount of frames that need to be processed to conserve power. In some examples, the disabling of synchronization may be a disabling of synchronization in the ISP 46A, ISP 46B, and 3A software modules (e.g., modules for auto-focus, auto-exposure, and auto-white balance are referred to 3A software modules) executing on CPU 16 (e.g., the modules that determine how ISP 46A, 46B operate), and disabling of synchronization, in some examples, in post processor 48A, 48B.

Accordingly, FIG. 2 illustrates an example where CPU 16, via HAL 50, determines that all image content captured by a first camera (e.g., camera 12B) is not needed for generating images for display. In this example, image content captured by a second camera (e.g., camera 12A) is processed for display. CPU 16, via HAL 50, adjusts an amount of power consumed by camera circuitry (e.g., camera processor 14B) coupled to the first camera based on the determination.

In other words, FIG. 2 illustrates an example where camera module 40 includes at least a first camera (e.g., camera 12B) and a second camera (e.g., camera 12A). CPU 16, via HAL 50, may determine what information from the first camera is needed to process image content captured by the second camera or to operate the second camera. CPU 16, via HAL 50, may adjust an operation mode of the first camera or camera circuitry (e.g., camera processor 14B) coupled to the first camera from a first operation s mode to a second operation mode. An amount of power consumed by the first camera or the camera circuitry coupled to the first camera in the second operation mode is less than an amount of power consumed by the first camera or the camera circuitry in the first operation mode.

As one example, assume that camera 12A does not use synchronization signals from camera 12B for determining when to capture image content (e.g., camera 12A is the master camera, and camera 12B is the slave camera). In this example, to adjust the amount of power, CPU 16, via HAL 50, may place camera 12B and camera processor 14B in sleep mode. In sleep mode, camera 12B does not generate image frames, and camera processor 14B does not process image frames. This example may also be applicable to the case where camera 12A uses synchronization signals from camera 12B for determining when to capture image content (e.g., where camera 12A is the slave camera, and camera 12B is the master camera).

As another example, assume that camera 12A uses synchronization signals from camera 12B for determining when to capture image content (e.g., camera 12A is the slave camera, and camera 12B is the master camera). In this example, camera 12B may generate image frames and the synchronization signals. To adjust the amount of power consumed, CPU 16, via HAL 50, may cause camera processor 14B (e.g., camera interface 42B) to drop from processing the generated image frames. This example may also be applicable to the case where camera 12B uses synchronization signals from camera 12A for determining when to capture image content (e.g., where camera 12B is the slave camera, and camera 12A is the master camera) such that camera 12B may generate image frames and the synchronization signals. To adjust the amount of power consumed, CPU 16, via HAL 50, may cause camera processor 14B (e.g., camera interface 42B) to drop from processing the generated image frames. In other words, it is not necessary that the frame drop mode is only available when image frames from the master sensor are not needed.

As another example, assume that camera 12A uses synchronization signals from camera 12B for determining when to capture image content (e.g., camera 12A is the slave camera, and camera 12B is the master camera). In this example, camera 12B may generate image frames and the synchronization signals. To adjust the amount of power consumed, CPU 16, via HAL 50, may cause camera processor 14B (e.g., camera interface 42B) to skip from processing one or more of the generated image frames. This example may also be applicable to the case where camera 12B uses synchronization signals from camera 12A for determining when to capture image content (e.g., where camera 12B is the slave camera, and camera 12A is the master camera) such that camera 12B may generate image frames and the synchronization signals. To adjust the amount of power consumed, CPU 16, via HAL 50, may cause camera processor 14B (e.g., camera interface 42B) to skip from processing one or more of the generated image frames. In other words, it is not necessary that the frame skip mode is only available when image frames from the master sensor are not needed.

Frame drop mode refers to an example mode where all frames are dropped from processing. Frame skip mode refers to an example mode where some, but not all frames, are dropped from processing.

In one example, CPU 16, via HAL 50, may disable use of synchronization signals. In this example, to adjust the amount of power consumed, CPU 16, via HAL 50, may cause camera processor 14B to process image frames at a frame rate that causes the amount of power consumed by camera processor 14B to reduce as compared to an amount of power consumed by camera processor 14B when all of the image content captured by camera 12B is used for generating images for display.

CPU 16, via HAL 50, may perform the operations of one or more of the example low power modes. In some examples, CPU 16, via HAL 50, may first determine if sleep mode is available (e.g., if images from the slave camera are not needed), and if available may perform the operations of the sleep mode. If sleep mode is not available, CPU 16, via HAL 50, may perform the operations of any of the frame drop, frame skip, or sync-disable modes.

Figure 3A:
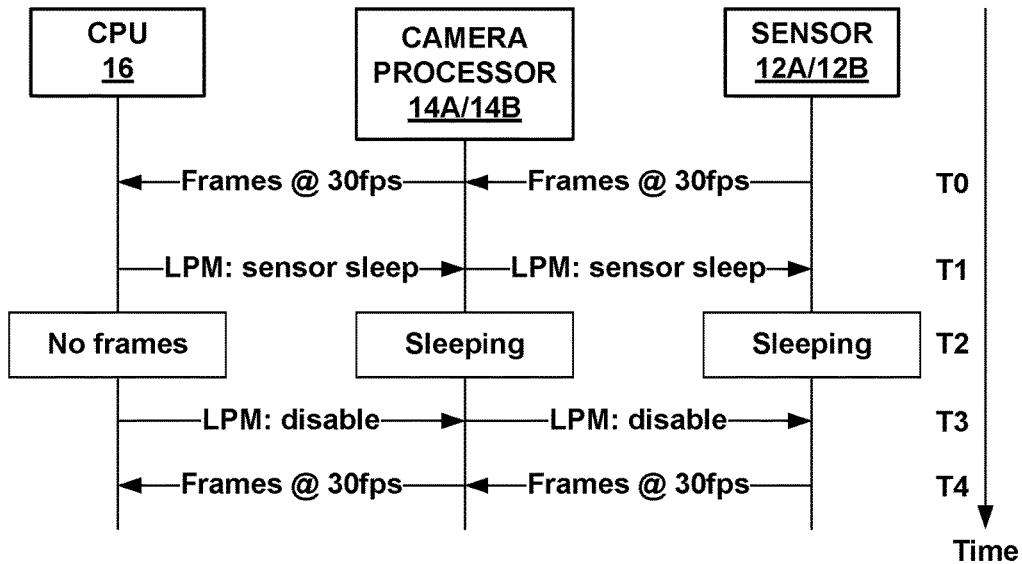
FIGS. 3A-3D are process diagrams illustrating example operations in accordance with one or more example techniques described in this disclosure.
Figure 3B:
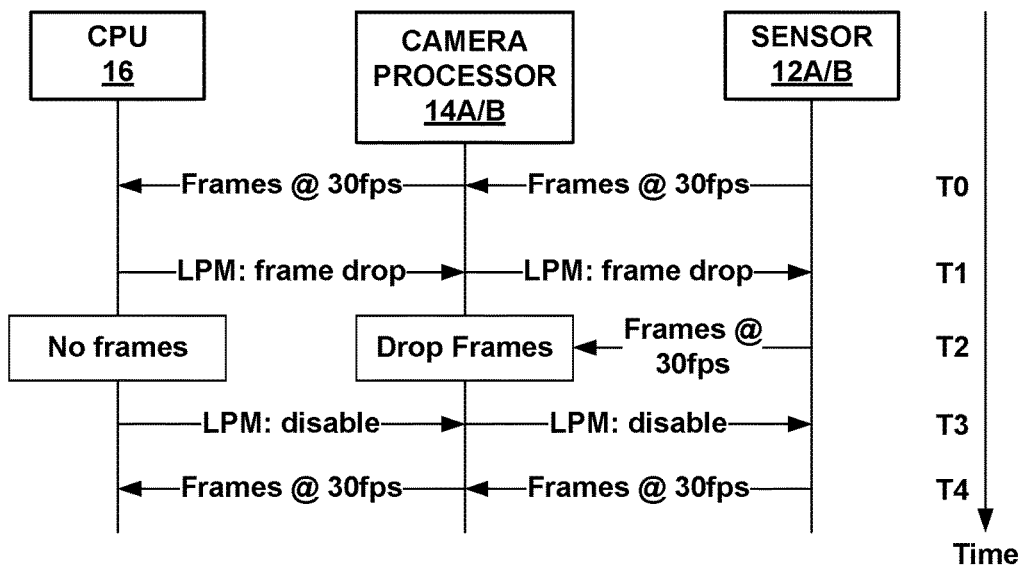
Figure 3C:
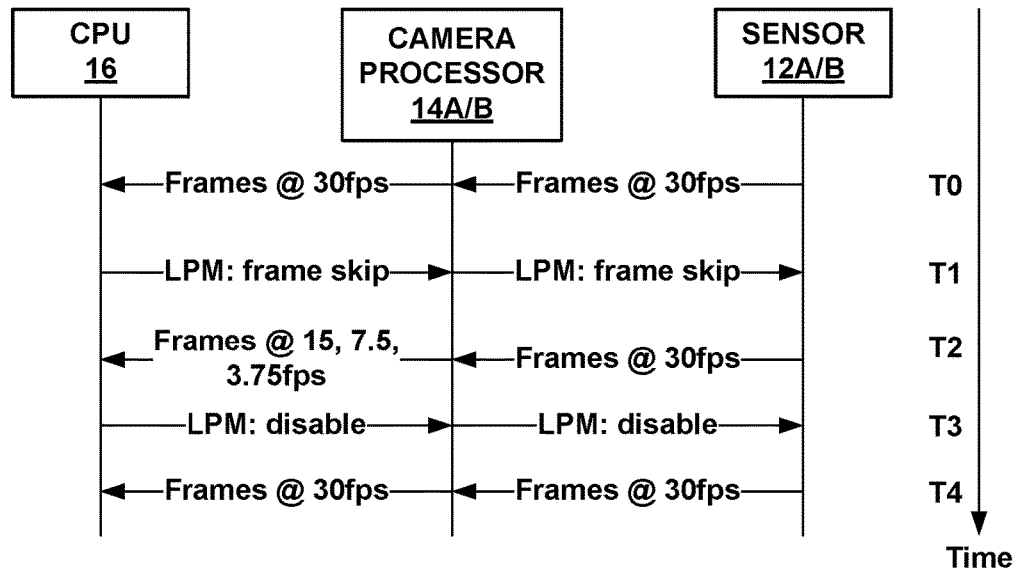

FIGS. 3A-3D are process diagrams illustrating example operations in accordance with one or more example techniques described in this disclosure. In FIGS. 3A-3C, assume that image frames from camera 12B are not needed. In FIGS. 3A-3C, CPU 16 (e.g., processing circuitry) may determine what information from the first camera (e.g., camera 12B) is needed to process image content captured by the second camera (e.g., camera 12A) or to operate the second camera. CPU 16 may then adjust an operation mode of camera 12B or camera processor 14B (e.g., camera circuitry coupled to the first camera) from a first operation mode to a second operation mode (e.g., normal mode to low power mode). An amount of power consumed by camera 12B or camera processor 14B in the second operation mode (e.g., low power mode) is different than an amount of power consumed by camera 12B or camera processor 14B in the first operation mode (e.g., normal mode). In some examples but not necessarily all, an amount of power consumed by camera 12B or camera processor 14B in the second operation mode (e.g., low power mode) is less than an amount of power consumed by camera 12B or camera processor 14B in the first operation mode (e.g., normal mode).

FIG. 3A illustrates an example of the sleep mode for the low power mode. At time T0, camera 12B is generating frames at a frame rate of 30 fps, and outputting them to camera processor 14B, which processes and outputs frames at 30 fps to CPU 16. At later time T1, CPU 16 issues a sleep instruction that camera processor 14B and camera 12B receive, and at later time T2, camera 12B and camera processor 14B are sleeping, and CPU 16 is receiving no frames. Then, at later time T3, CPU 16 issues a command to disable the low power mode (LPM) and return to normal mode. At later time T4, camera 12B outputs image frames at 30 fps to camera processor 14B, and camera processor 14B outputs image frames at 30 fps to CPU 16.

FIG. 3B illustrates an example of the frame drop mode for the low power mode (LPM). At time T0, camera 12B is generating 30 fps, and outputting them to camera processor 14B, which processes and outputs 30 fps to CPU 16. At time T1, CPU 16 issues a frame drop instruction that camera processor 14B receives. At later time T2, camera 12B keeps generating frames at 30 fps, and outputting them to camera processor 14B. However, camera processor 14B drops the frames, and CPU 16 does not receive frames. Then, at later time T3, CPU 16 issues a command to disable the low power mode and return to normal mode. At later time T4, camera 12B outputs image frames at 30 fps to camera processor 14B, and camera processor 14B outputs image frames at 30 fps to CPU 16.

FIG. 3C illustrates an example of the frame skip mode for the low power mode. At time T0, camera 12B is generating 30 fps, and outputting them to camera processor 14B, which processes and outputs 30 fps to CPU 16. At later time T1, CPU 16 issues a frame skip instruction that camera processor 14B receives. At later time T2, camera 12B keeps generating frames at 30 fps, and outputting them to camera processor 14B. However, camera processor 14B skips processing of one or more of the generated frames, and outputs frames to CPU 16 at a lower frame rate (e.g., 15, 7.5, 3.75 fps). Then at later time T3, CPU 16 issues a command to disable the low power mode and return to normal mode. At later time T4, camera 12B outputs image frames at 30 fps to camera processor 14B, and camera processor 14B outputs image frames at 30 fps to CPU 16.

Figure 3D:
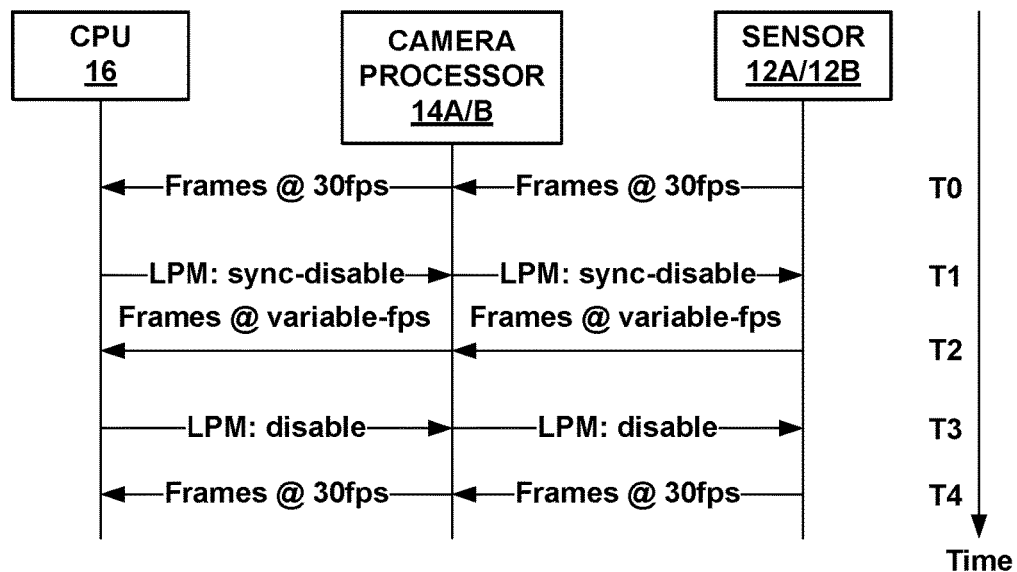

FIG. 3D illustrates an example of the sync-disable mode for the low power mode. At time T0, camera 12B is generating 30 fps, and outputting them to camera processor 14B, which processes and outputs frames at 30 fps to CPU 16. At time T1, CPU 16 issues a sync-disable instruction that camera 12B and camera processor 14B receives. At later time T2, camera 12B keeps generating frames at 30 fps, and outputting them to camera processor 14B. However, camera processor 14B can operate at any frame rate, such as a frame rate different from 30 fps (e.g., "X" fps), and outputs frames to CPU 16. Then, at later time T3, CPU 16 issues a command to disable the low power mode and return to normal mode. At later time T4, camera 12B outputs image frames at 30 fps to camera processor 14B, and camera processor 14B outputs image frames at 30 fps to CPU 16.

In general, on some chips, power mitigation will be less aggressive. In general, the trade-off will be performance over power. When the aux-camera (e.g., camera 12B in the above examples) is not needed, it will be put to sleep, but the system (e.g., CPU 16) will frequently keep both cameras on to provide the best user experience and minimize camera switching delays.

On some chips, power mitigation will be more aggressive. In general, there will be a balance between performance and power. When the aux-camera is not needed it will be put to sleep, and the system will minimize how frequently the cameras are on together. However, there will be times when the system runs both cameras together to provide an enhanced user experience.

On some chips, power mitigation will be extremely aggressive. The priority will be power over performance. The system will keep the aux-camera asleep unless it is required for a basic function. Additionally, when the aux-camera is awake, it will only be run at a reduced frame rate (e.g., skip-mode and/or independent-frame-rate-mode).

The following are some example operation scenarios. Algorithm (e.g., HAL 50 or FOVC 52, determines full-frame-rate synchronized image/stats data is required from both cameras 12A and 12B. In this example, main camera (e.g., camera 12A) and auxiliary camera (e.g., camera 12B) are at full power with matched fps. Examples of this scenario include the following. User is applying zoom, and HAL 50 or FOVC 52 keeps both cameras 12A and 12B awake to minimize preview switch time. Dual-image capture is in progress, and HAL 50 or FOVC 52 keeps both cameras 12A and 12B awake to allow synchronized image capture. The active camera is tele (e.g., camera 12A is a tele-camera), but the scene is "dark," and HAL 50 or FOVC 52 keeps camera 12B, which is a wide-camera, awake for exposure "aiding." Active camera is tele (e.g., camera 12A is a tele-camera), but tele lacks 2PD (dual photodiode), and algorithm decides high-speed AF (autofocus) is needed, and keeps camera 12B, which is a wide-camera, awake to use Wide-2PD for autofocus "aiding".

As another example, HAL 50 or FOVC 52 determines maximum power saving is appropriate and camera processor 14B supports full sleep. In this example, camera 12A is able to operate at full power, and auxiliary camera 12B is at sensor sleep (e.g., FIG. 3A). Examples of this scenario include the following. HAL 50 or FOVC 52 decides stats "aiding" is not useful for the current scene. For example, aiding may not be useful when camera 12A and camera processor 14A process the image frame without needing information from camera 12B. HAL 50 or FOVC 52 detects "thermal mitigation" required (e.g., based on information from a temperature sensor), and shuts down aux-camera 12B to reduce heat generation and/or power consumption.

As another example, HAL 50 or FOVC 52 determines maximum power saving is appropriate but limitations of camera processor 14B or camera 12B prevent full sleep. In this example, main camera 12A is operating at full power, and auxiliary camera 12B and camera processor 14B are dropping frames (e.g., frame drop such as FIG. 3B). Examples of this scenario include the following. HAL 50 or FOVC 52 decides stats "aiding" is not useful for the current scene. HAL 50 or FOVC 52 detects "thermal mitigation" is required, and shuts down aux-cam (e.g., camera 12B) to reduce heat generation and/or power consumption.

As another example, HAL 50 or FOVC 52 determines aux-camera 12B is needed but at a reduced frame rate. This mode is used because either camera 12A or camera 12B does not support sync-disable or HAL 50 or FOVC 52 needs the frames to be temporally matched. In this example, main camera 12A is operating at full power, and auxiliary camera 12B is skipping frames (e.g., frame skip such as FIG. 3C). Examples of this scenario include camera processor 14B not supporting frame rate sync disable. HAL 50 or FOVC 52 decides some exposure/focus "aiding" is useful, but the aiding can be done at a lower frame-rate. As an example, there may be power saving by HAL 50 or FOVC 52 configuring the aux-camera 12B and camera processor 14B to provide one synchronized aux-cam-frame from camera 12B every four main-cam-frames from camera 12A.

As another example, aux-camera 12B is needed for stereoscopic depth estimate at 10 hz. Aux-camera 12B frames may need to be temporally matched with main-camera 12A frames to be useful, but frames are needed infrequently. There may be power saving by HAL 50 or FOVC 52, e.g., by configuring the aux-camera 12B to provide one synchronized aux-cam-frame every the main-cam-frames.

As further examples, HAL 50 or FOVC 52 needs both cameras 12A and 12B to run, but camera synchronization is not required and camera processors 14A and 14B and cameras 12A and 12B support sync-disable. In this example, main camera 12A is operating at full power, and auxiliary camera 12B is operating at a fully independent frame rate (e.g., FIG. 3D). Examples of this scenario include the following. HAL 50 or FOVC 52 decides during start-up to run the aux-camera 12B at high frame rate to help provide a fast AEC (auto exposure control) estimate. HAL 50 or FOVC 52 decides aux-camera 12B will provide better AWB (auto white balance) estimates due to intrinsic camera characteristics of camera 12B, but camera 12A only needs an AWB estimate occasionally. HAL 50 or FOVC 52 may configure aux-camera 12B at 5 hz to save power.

Figure 4:
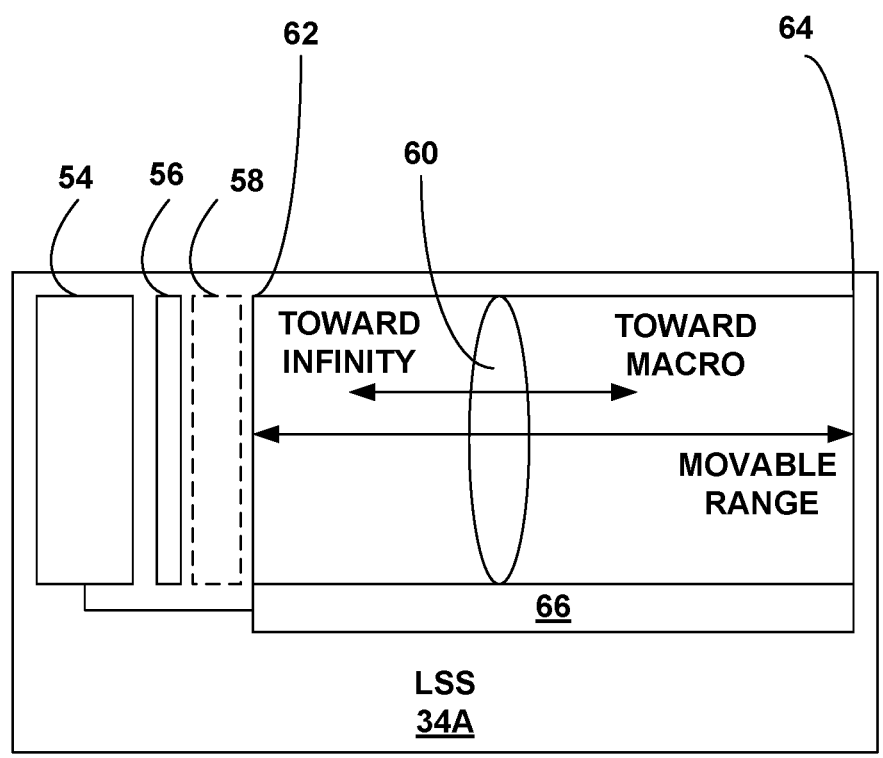
FIG. 4 is a block diagram illustrating an example lens sub-system of FIG. 2 in greater detail.

FIG. 4 is a block diagram illustrating an example lens sub-system (LSS) 34A of FIG. 2 in greater detail. LSS 34B may be similar to LSS 34A.

As described above, dual camera sensors (e.g., camera 12A and camera 12B) operate in master-slave mode. The master camera may be active all of the time, and the slave camera may either remain operational (active) or inactive depending upon the use case. However, both cameras 12A and 12B may not be required to operate in certain use cases. For instance, as described above, a first camera sensor captures a relatively large field of view (e.g., wide angle), and may be referred to as a wide sensor or wide camera, and a second camera sensor captures a smaller field of view as compared to the first camera but with better detail, and may be referred to as a tele-camera. Camera 12A may be the wide camera or the tele camera, and camera 12B may be the other one of the wide camera or tele camera. For example, camera 12A may be the tele camera and camera 12B may be the wide camera. Alternatively, camera 12A may be the wide camera and camera 12B may be the tele camera.

Example cases when both cameras 12A and 12B are not required to be operational include those examples provided above and also the following non-limiting examples. When the wide camera 12A is operating in wide zoom region, the tele camera 12B may be put to sleep. When the tele camera 12B is operating in tele zoom region, the wide camera 12A may be put to sleep. As more examples, when the mono preview is not active, then the mono camera (which may be one of wide or tele camera or another camera type) may be put to sleep. When the scene is static, there is no change in zoom or brightness, and camera 12A and 12B may not be needed, and when the user is not actively capturing images, camera 12A and 12B may not be needed.

As illustrated in FIG. 4, camera 12A includes CMOS array 56 (as one non-limiting example) for capturing light, and sensor chip 54. Additionally, camera 12A includes mounting space 58 and an autofocus (AF) component. The AF component includes actuator 66 and lens 60. Actuator 66 may be configured to move lens 60 between first end 62 and second end 64. One example way in which actuator 66 moves lens 60 is via a voice coil motor (VCM). For instance, actuator 66 includes a spring attached to lens 60. Actuator 66 is illustrated to assist with understanding, and need not be sized or positioned in the manner illustrated in FIG. 4.

In FIG. 4, the scene to be captured is to the right of the LSS 34A so that light enters through lens 60 and to the CMOS array 56. First end 62 may be for the infinity position, and second end 64 may be for the macro position. Infinity position is the place where lens 60 is near to CMOS array 56 (e.g., near to image sensor), and macro position is the place where lens 60 is far from CMOS array 56 (e.g., far from image sensor).

In some cases, the slave sensor actuator (e.g., actuator 66 in examples where camera 12A is the slave camera) may cause lens 60 to remain in the current lens position during an inactive mode. Actuator 66 may keep drawing current during inactive mode, which may result in additional consumption of power. However, in some cases, power consumption is less in the infinity position as compared to the macro position (e.g., power consumption is less when lens 60 is at or near first end 62 as compared to when lens 60 is at or near second end 64). As described above, in some examples, even though camera 12A may be inactive, lens 60 may be kept at its position at the time when camera 12A became inactive. In some examples, moving lens 60 to the infinity position when camera 12A is inactive may reduce power consumption.

Figure 5A:
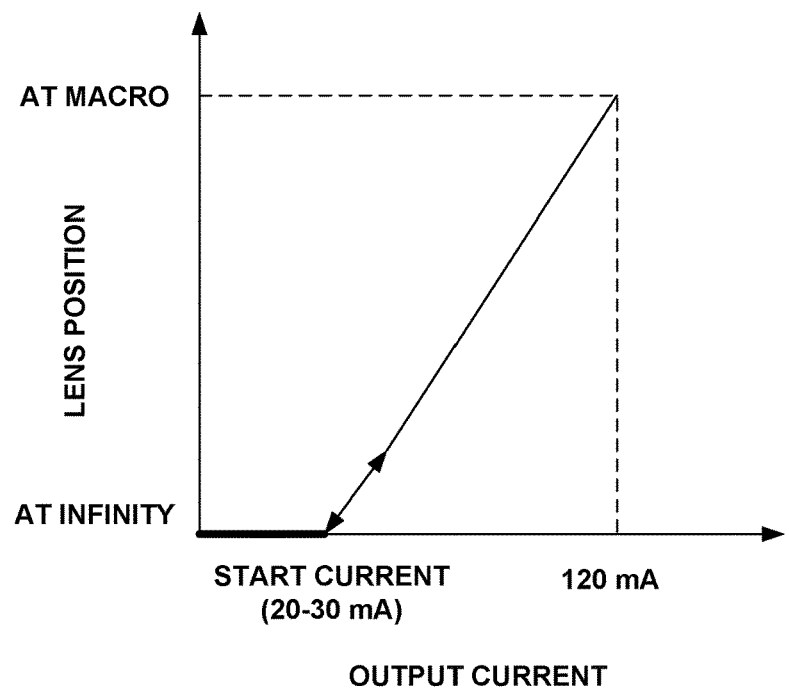
FIG. 5A is a graph of current consumption based on lens position for a first type of voice coil motor (VCM).

FIG. 5A is a graph of current consumption based on lens position for a first type of voice coil motor (VCM). For instance, FIG. 5A illustrates an example of a typical conventional VCM, which may include actuator 66. As illustrated in FIG. 5A, when lens 60 is at infinity position (e.g., first end 62) the current consumption (e.g., by actuator 66) is relatively low, and approximately 20-30 mA of current is needed to start the LSS 34A. The current consumption increases as lens 60 moves from infinity position (e.g., first end 62) to the macro position (e.g., second end 64), where at the macro position, VCM consumes approximately 120 mA. In this example, power at the max current position (e.g., macro position) may be 336 mW, and power at the low power position (e.g., infinity position) may be 56 mW.

Figure 5B:
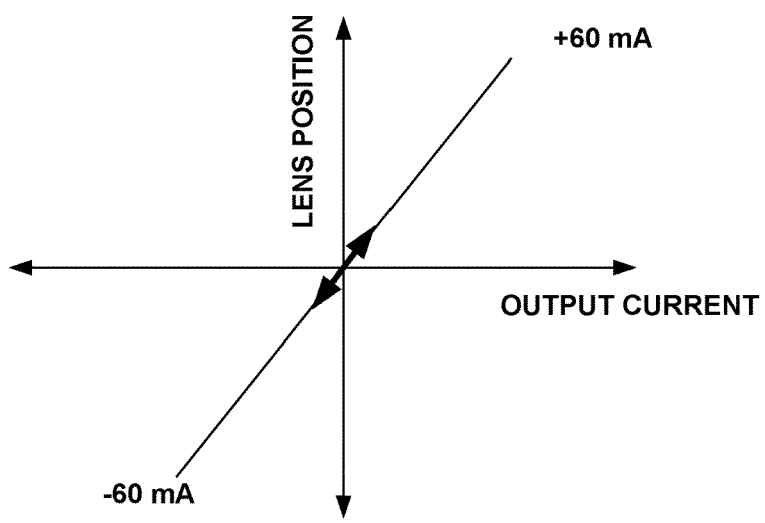
FIG. 5B is a graph of current consumption based on lens position for a second type of VCM.

FIG. 5B is a graph of current consumption based on lens position for a second type of VCM. For instance, FIG. 5B illustrates an example of a bi-directional VCM, which may be part of actuator 66. As illustrated in FIG. 5B, when lens 60 is in a first position (e.g., not too far from starting point), the current consumption is relatively low. The current consumption increases as lens 60 moves away from the starting point. In this example, power at the max current position may be 168 mW, and power at low power position may be 10 mW.

The example techniques described in this disclosure may adjust the position of lens 60 to conserve power when camera 12A is inactive. For example, when the slave camera 12A is active, the lens position of lens 60 can be anywhere between macro and infinity. When the system (e.g., CPU 16, via HAL 50, camera processor 14A, and/or sensor chip 54) places slave camera 12A in inactive mode, CPU 16, via HAL 50, or camera processor 14A may generate a signal to sensor chip 54 that causes sensor chip 54 to cause actuator 66 to place lens 60 to the lower or lowest power consumption position. In some examples, CPU 16, via HAL 50, or camera processor 14A may directly cause actuator 66 to place lens 60 to the lower or lowest power consumption position. In some examples, sensor chip 54 may generate the signal that causes actuator 66 to place lens 60 to the lower or lowest power consumption position.

Based on the VCM characteristics, the lower or lowest power consumption position is close to or at the infinity position (e.g., furthest way from CMOS sensor chip 54 in a standard VCM). In some examples, the lower or lowest power consumption position is the center between macro and infinity positions (e.g., in a bi-directional VCM). The position may be stored in non-volatile memory (e.g., memory 30) as part of calibration, and CPU 16 or camera processor 14A may read the position value from memory 30 to set lens 60 at the lower power position.

When slave camera 12A moves to the active state from inactive state, the system (e.g., CPU 16, via HAL 50, camera processor 14A, and/or sensor chip 54) may move lens 60 from the low power position to a different position (e.g., the desired lens position). Lens 60 may remain in the linear region.

Also, powering down actuator 66 may also save power, but actuator 66, the VCM, and/or lens 60 may need to be reinitialized to bring them back to operation mode. Powering down may cost time compared to placing lens 60 in the low power position (e.g., where VCM and/or actuator 66 more generally consumes less power), and sharing of power between camera 12A and 12B may be an issue.

In this way, the example techniques may save power for device 10. Lens 60 may move to a low power state that will reduce heating of device 10 during dual camera operation. Lens 60 may remain in the linear region, and resume autofocus operation quickly without any reinitialization. Although the above examples are with respect to camera 12A, the example techniques may be equally applicable to camera 12B.

Figure 6:
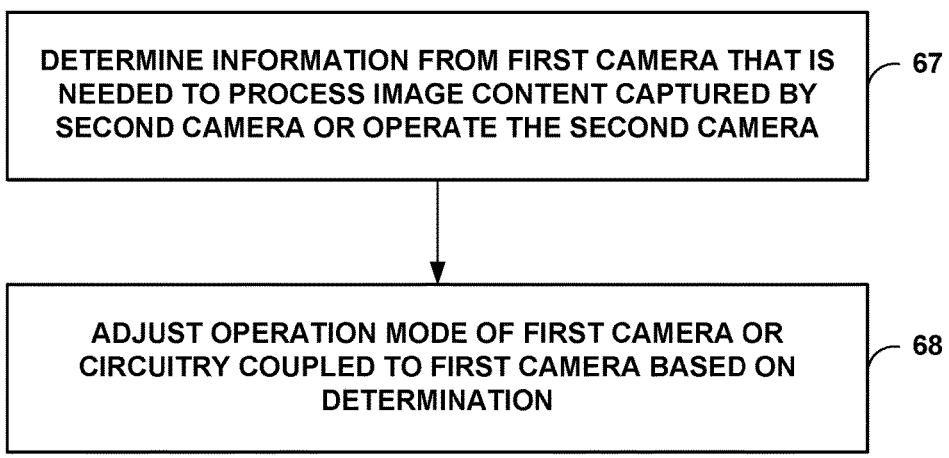
FIG. 6 is a flowchart illustrating example operations in accordance with one or more of the example techniques described in this disclosure.

FIG. 6 is a flowchart illustrating example operations in accordance with one or more of the example techniques described in this disclosure. For instance, FIG. 6 is described with respect to FIGS. 2 and 4. As illustrated in FIG. 2, device 10 includes a camera module 40 that includes at least a first camera (e.g., camera 12B) and a second camera (e.g., camera 12A). FIG. 4 illustrates a lens sub-system (LSS) 34 of FIG. 2.

Processing circuitry (e.g., CPU 16 via HAL 50 or FOVC 52) may determine what information from first camera (e.g., camera 12B) is needed to process image content captured by second camera (e.g., camera 12A) or to operate the second camera (67). There may be various ways in which the processing circuitry may determine what information is needed. As one example, the processing circuitry may determine whether aiding such as autofocus, automatic exposure control, or automatic white balance is needed. For instance, image content captured from camera 12B may be useful for camera 12A or camera processor 14A to perform autofocus, automatic exposure control, or automatic white balance. However, the processing circuitry may determine that camera 12A does not need to continuously receive such aiding information from camera 12B. As another example, the processing circuitry may determine that camera 12A uses synchronization signals from camera 12B for capturing image content.

The processing circuitry may adjust an operation mode of at least one of camera 12B or camera circuitry (e.g., camera processor 14B) coupled to camera 12B from a first operation mode to a second operation mode based on the determination (68). An amount of power consumed by camera 12B or camera processor 14B in the second operation mode is different (e.g., less) than an amount of power consumed by camera 12B or camera processor 14B in the first operation mode.

In general, the processing circuitry may be configured to perform the following operations:

IF (some or all of camera 12B images are unnecessary for camera 12A to function)
    AND (power(camera 12B in second operation mode)
        <power(camera 12B in first operation mode) is TRUE,
        then the processing circuitry adjusts operation mode
        from first operation mode to second operation mode.

In some examples:

IF (some or all of camera 12B images are unnecessary for camera 12A to function)
    AND (power(camera 12B in second operation mode)+
        power(camera 12A in first operation mode)<power
        (camera 12B in first operation mode)+power(camera
        12A in first operation mode) is TRUE, then the processing circuitry adjusts operation mode from first
        operation mode to second operation mode.

Power( ) refers to the power used by a camera and/or circuitry coupled to the camera. The processing circuitry refers to CPU 16 as one example.

The following are some example operations that the processing circuitry may perform. These example techniques may be applied separately or together.

In one example, in the first operation mode, camera 12A may use synchronization signals from camera 12B for capturing image content. To determine what information from camera 12B is needed, the processing circuitry (e.g., CPU 16) is configured to determine that camera 12A needs to use synchronization signals from camera 12B in the second operation mode but not the image content. In some examples, to adjust the operation mode, the processing circuitry (e.g., CPU 16) is configured to cause camera processor 14B to drop from processing all image frames generated by camera 12B.

In this example, in the first operation mode, camera 12A uses synchronization signals from camera 12B for determining when to capture image content, and camera processor 14A coupled to camera 12A uses image content from camera 12B for processing image content captured by camera 12A. In the second operation mode, camera 12A uses synchronization signals from camera 12B for determining when to capture image content, and camera processor 14A coupled to camera 12A does not use image content from camera 12B for processing image content captured by camera 12A. CPU 16 is configured to cause camera processor 14B coupled to camera 12B to drop from processing all image frames generated by camera 12B in the second operation mode.

As another example, to determine what information from camera 12B is needed, the processing circuitry is configured to determine that in the first operation mode and the second operation mode, camera 12A uses synchronization signals from camera 12B for capturing image content. In some examples, to adjust the operation mode, the processing circuitry is configured to cause camera processor 14B to process some image frames generated from camera 12B and skip processing of some image frames generated from camera 12B.

In this example, in the first operation mode, camera 12A uses synchronization signals from camera 12B for determining when to capture image content, and camera processor 14A coupled to camera 12A uses image content from camera 12B for processing image content captured by camera 12A. In the second operation mode, camera 12A uses synchronization signals from camera 12B for determining when to capture image content, and camera processor 14A coupled to camera 12A uses some but not all of the image content from camera 12B for processing image content captured by camera 12A. CPU 16 is configured to cause camera processor 14B coupled to camera 12B to process some image frames generated from camera 12B and skip processing of some image frames generated from camera 12B in the second operation mode.

As another example, camera processor 14B is configured to generate image frames from camera 12B at a first rate in the first operation mode. To determine what information from the first camera is needed, the processing circuitry is configured to determine that camera 12A does not need to use synchronization signals from camera 12B in the second operation mode. To adjust the operation mode, the processing circuitry is configured to cause camera processor 14B to generate image frames at a second rate in the second operation mode. The second rate is lower than the first rate. In some examples, camera processor 14A (e.g., second camera circuitry coupled to the second camera) may be configured to generate image frames from the camera 12A at a third rate that is greater than the second rate. For instance, if camera processor 14B is outputting at 10 fps, camera processor 14A may be outputting at 60 fps.

As described above, such as with respect to FIG. 4, camera 12B includes a lens (e.g., like lens 60). To adjust the operation mode, the processing circuitry is configured to adjust the lens from a first position (e.g., current position) in the first operation mode to a low power position, different from the first position, in the second operation mode. For example, the lens is moveable between a first end and a second end, where the first end is closer to an image sensor of camera 12B relative to the second end, and the low power position is a position that is closer to the first end than the second end (e.g., in a standard VCM) or at a center between the first end and the second end (e.g., in a bidirectional VCM). Also, in some examples, the processing circuitry is configured to adjust the position of the lens form the low power position based on a determination that image content from the first camera is needed.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for image processing, the device comprising: processing circuitry configured to:
   determine what information from a first camera is needed to process image content captured by a second camera or to operate the second camera; and
   adjust an operation mode of at least one of the first camera or camera circuitry coupled to the first camera from a first operation mode to a second operation mode, different than the first operation mode, based on the determination, wherein an amount of power consumed by the first camera or the camera circuitry coupled to the first camera in the second operation mode is different than an amount of power consumed by the first camera or the camera circuitry coupled to the first camera in the first operation mode,
   wherein a difference between the first operation mode and the second operation mode comprises at least one of a group consisting of:
      in the first operation mode, the first camera transmitting synchronization signals, and the camera circuitry coupled to the first camera processing image frames generated by the first camera in the first operation mode, and in the second operation mode, the first camera transmitting synchronization signals, and the camera circuitry coupled to the first camera dropping the processing of all image frames generated by the first camera in the second operation mode;
      in the first operation mode, the first camera transmitting synchronization signals, and the camera circuitry coupled to the first camera processing image frames generated by the first camera in the first operation mode, and in the second operation mode, the first camera transmitting synchronization signals, and the camera circuitry coupled to the first camera skipping the processing of one or more image frames generated by the first camera in the second operation mode; and in the first operation mode, the first camera and the second camera generating image frames at the same rate in the first operation mode based on the first camera transmitting synchronization signals, and in the second operation mode, the first camera and the second camera generating image frames at different rates in the second operation mode based on the first camera not transmitting synchronization signals.

2. The device of claim 1, further comprising a camera module that includes at least the first camera and the second camera.

3. The device of claim 1, wherein the amount of power consumed by the first camera or the camera circuitry coupled to the first camera in the second operation mode is less than the amount of power consumed by the first camera or the camera circuitry coupled to the first camera in the first operation mode.

4. The device of claim 1, wherein the processing circuitry is configured to:
determine that the first camera can be disabled; and
based on the determination that the first camera can be disabled, cause the camera circuitry to drop from processing all image frames generated by the first camera or skip processing of one or more image frames generated by the first camera.

5. The device of claim 1, wherein the first camera comprises a lens, and wherein to adjust the operation mode, the processing circuitry is configured to adjust the lens from a first position in the first operation mode to a low power position, different than the first position, in the second operation mode.

6. The device of claim 5, wherein the lens is movable between a first end and a second end, wherein the first end is closer to an image sensor of the first camera relative to the second end, and wherein the low power position comprises a position that is closer to the first end than the second end or at a center between the first end and the second end.

7. The device of claim 5, wherein the processing circuitry is configured to adjust the position of the lens from the low power position to a different position based on a determination that image content from the first camera is needed.

8. The device of claim 1, wherein in the second operation mode, the second camera uses the synchronization signals from the first camera for determining when to capture image content, and the camera circuitry coupled to the second camera does not use image content from the first camera for processing image content captured by the second camera, and wherein the processing circuitry is configured to cause the camera circuitry coupled to the first camera to drop from processing all image frames generated by the first camera in the second operation mode.

9. The device of claim 1, wherein in the second operation mode, the second camera uses the synchronization signals from the first camera for determining when to capture image content, and the camera circuitry coupled to the second camera uses some but not all of the image content from the first camera for processing image content captured by the second camera, and the processing circuitry is configured to cause the camera circuitry coupled to the first camera to process some image frames generated from the first camera and skip processing of some image frames generated from the first camera in the second operation mode.

10. The device of claim 1, wherein the camera circuitry coupled to the first camera is configured to generate image frames from the first camera at a first rate in the first operation mode, and wherein to adjust the operation mode, the processing circuitry is configured to cause the camera circuitry coupled to the first camera to generate image frames at a second rate in the second operation mode, wherein the second rate is different than the first rate in the second operation mode.

11. A method of image processing, the method comprising:
determining, with processing circuitry, what information from a first camera is needed to process image content captured by a second camera or to operate the second camera; and
adjusting, with the processing circuitry, an operation mode of one of the first camera or camera circuitry coupled to the first camera from a first operation mode to a second operation mode, different than the first operation mode, based on the determination, wherein an amount of power consumed by the first camera or the camera circuitry coupled to the first camera in the second operation mode is different than an amount of power consumed by the first camera or the camera circuitry coupled to the first camera in the first operation mode,
wherein a difference between the first operation mode and the second operation mode comprises at least one of a group consisting of:
in the first operation mode, the first camera transmitting synchronization signals, and the camera circuitry coupled to the first camera processing image frames generated by the first camera in the first operation mode, and in the second operation mode, the first camera transmitting synchronization signals, and the camera circuitry coupled to the first camera dropping the processing of all image frames generated by the first camera in the second operation mode;
in the first operation mode, the first camera transmitting synchronization signals, and the camera circuitry coupled to the first camera processing image frames generated by the first camera in the first operation mode, and in the second operation mode, the first camera transmitting synchronization signals, and the camera circuitry coupled to the first camera skipping the processing of one or more image frames generated by the first camera in the second operation mode; and
in the first operation mode, the first camera and the second camera generating image frames at the same rate in the first operation mode based on the first camera transmitting synchronization signals, and in the second operation mode, the first camera and the second camera generating image frames at different rates in the second operation mode based on the first camera not transmitting synchronization signals.

12. The method of claim 11, wherein a camera module includes at least the first camera and the second camera.

13. The method of claim 11, wherein the amount of power consumed by the first camera or the camera circuitry coupled to the first camera in the second operation mode is less than the amount of power consumed by the first camera or the camera circuitry coupled to the first camera in the first operation mode.

14. The method of claim 11, further comprising:
    determining that the first camera can be disabled; and
    based on the determination that the first camera cannot can be disabled, causing the camera circuitry to drop from processing all image frames generated by the first camera or skip processing of one or more image frames generated by the first camera.

15. The method of claim 11, wherein the first camera comprises a lens, and wherein adjusting the operation mode comprises adjusting the lens from a first position in the first operation mode to a low power position, different than the first position, in the second operation mode.

16. The method of claim 15, wherein the lens is movable between a first end and a second end, wherein the first end is closer to an image sensor of the first camera relative to the second end, and wherein the low power position comprises a position that is closer to the first end than the second end or at a center between the first end and the second end.

17. The method of claim 15, wherein adjusting the lens comprises adjusting the position of the lens from the low power position to a different position based on a determination that image content from the first camera is needed.

18. The method of claim 11, wherein in the second operation mode, the second camera uses the synchronization signals from the first camera for determining when to capture image content, and the camera circuitry coupled to the second camera does not use image content from the first camera for processing image content captured by the second camera, the method further comprising causing the camera circuitry coupled to the first camera to drop from processing all image frames generated by the first camera in the second operation mode.

19. The method of claim 11, wherein in the second operation mode, the second camera uses the synchronization signals from the first camera for determining when to capture image content, and the camera circuitry coupled to the second camera uses some but not all of the image content from the first camera for processing image content captured by the second camera, the method further comprising causing the camera circuitry coupled to the first camera to process some image frames generated from the first camera and skip processing of some image frames generated from the first camera in the second operation mode.

20. The method of claim 11, wherein the camera circuitry coupled to the first camera is configured to generate image frames from the first camera at a first rate in the first operation mode, and wherein adjusting the operation mode comprises causing the camera circuitry coupled to the first camera to generate image frames at a second rate in the second operation mode, wherein the second rate is different than the first rate in the second operation mode.

21. A non-transitory computer-readable storage medium storing instructions thereon that when executed cause one or more processors of a device for image processing to:
    determine what information from a first camera is needed to process image content captured by a second camera or to operate the second camera; and
    adjust an operation mode of one of the first camera or camera circuitry coupled to the first camera from a first operation mode to a second operation mode, different than the first operation mode, based on the determination, wherein an amount of power consumed by the first camera or the camera circuitry coupled to the first camera in the second operation mode is different than an amount of power consumed by the first camera or the camera circuitry coupled to the first camera in the first operation mode,
    wherein a difference between the first operation mode and the second operation mode comprises at least one of a group consisting of:
        in the first operation mode, the first camera transmitting synchronization signals, and the camera circuitry coupled to the first camera processing image frames generated by the first camera in the first operation mode, and in the second operation mode, the first camera transmitting synchronization signals, and the camera circuitry coupled to the first camera dropping the processing of all image frames generated by the first camera in the second operation mode;
        in the first operation mode, the first camera transmitting synchronization signals, and the camera circuitry coupled to the first camera processing image frames generated by the first camera in the first operation mode, and in the second operation mode, the first camera transmitting synchronization signals, and the camera circuitry coupled to the first camera skipping the processing of one or more image frames generated by the first camera in the second operation mode; and
        in the first operation mode, the first camera and the second camera generating image frames at the same rate in the first operation mode based on the first camera transmitting synchronization signals, and in the second operation mode, the first camera and the second camera generating image frames at different rates in the second operation mode based on the first camera not transmitting synchronization signals.

22. The non-transitory computer-readable storage medium of claim 21, wherein the amount of power consumed by the first camera or the camera circuitry coupled to the first camera in the second operation mode is less than the amount of power consumed by the first camera or the camera circuitry coupled to the first camera in the first operation mode.

23. The non-transitory computer-readable storage medium of claim 21, further comprising instructions that cause the one or more processors to:
    determine that the first camera can be disabled; and
    based on the determination that the first camera can be disabled, cause the camera circuitry to drop from processing all image frames generated by the first camera or skip processing of one or more image frames generated by the first camera.

24. The non-transitory computer-readable storage medium of claim 21, wherein the first camera comprises a lens, and wherein the instructions that cause the one or more processors to adjust the operation mode comprise instructions that cause the one or more processors to adjust the lens from a first position in the first operation mode to a low power position, different than the first position, in the second operation mode.

25. The non-transitory computer-readable storage medium of claim 24, wherein the instructions that cause the one or more processors to adjust the lens comprise instructions that cause the one or more processors to adjust the position of the lens from the low power position to a different position based on a determination that image content from the first camera is needed.

26. A device for image processing, the device comprising:
    means for determining what information from a first camera is needed to process image content captured by a second camera or to operate the second camera; and
    means for adjusting an operation mode of one of the first camera or camera circuitry coupled to the first camera from a first operation mode to a second operation mode, different than the first operation mode, based on the determination, wherein an amount of power consumed by the first camera or the camera circuitry coupled to the first camera in the second operation mode is different than an amount of power consumed by the first camera or the camera circuitry coupled to the first camera in the first operation mode,
    wherein a difference between the first operation mode and the second operation mode comprises at least one of a group consisting of:
        in the first operation mode, the first camera transmitting synchronization signals, and the camera circuitry coupled to the first camera processing image frames generated by the first camera in the first operation mode, and in the second operation mode, the first camera transmitting synchronization signals, and the camera circuitry coupled to the first camera dropping the processing of all image frames generated by the first camera in the second operation mode;
        in the first operation mode, the first camera transmitting synchronization signals, and the camera circuitry coupled to the first camera processing image frames generated by the first camera in the first operation mode, and in the second operation mode, the first camera transmitting synchronization signals, and the camera circuitry coupled to the first camera skipping the processing of one or more image frames generated by the first camera in the second operation mode; and
        in the first operation mode, the first camera and the second camera generating image frames at the same rate in the first operation mode based on the first camera transmitting synchronization signals, and in the second operation mode, the first camera and the second camera generating image frames at different rates in the second operation mode based on the first camera not transmitting synchronization signals.

27. The device of claim 26, further comprising a camera module that includes at least the first camera and the second camera.

28. The device of claim 26, wherein the amount of power consumed by the first camera or the camera circuitry coupled to the first camera in the second operation mode is less than the amount of power consumed by the first camera or the camera circuitry coupled to the first camera in the first operation mode.

* * * * *